Dec. 16, 1969  J. C. LOMBARDI  3,483,816
BROILING UTENSIL
Filed Jan. 29, 1968

INVENTOR
José Carlos Lombardi
BY
ATTORNEY 3,483,816
BROILING UTENSIL
José C. Lombardi, 1810 Virrey del Pino,
Buenos Aires, Argentina
Filed Jan. 29, 1968, Ser. No. 701,335
Int. Cl. A47j 37/04
U.S. Cl. 99—421                                              4 Claims

ABSTRACT OF THE DISCLOSURE

A broiling utensil constructed with a supporting bar adapted to be partly driven into the ground and adapted to carry a fork-like broiler member. The broiler member has at one end a plurality of removable spit members extending through two arms and at the other end a handle and stop member. The supporting bar has mounted thereon a tubular body with a clamping screw member and an upstanding wing member terminating in a pair of diverging end portions, the spaced edges of which have at least one semi-circular notch and the notches have respective coaxial centers which constitute bearing points for the broiler member stem, whereby the broiler member is turnable and removable relative to the supporting bar.

---

This invention relates to a novel utensil for broiling or roasting over a fire on the ground, and more particularly to a broiling utensil of the type comprising a supporting bar adapted to be driven partly into the ground and complementary rod means for holding raw food, specially meat, to be broiled.

It is known that when it is desired to broil meat or other food products in the open, over a fire on the ground use is generally made of a large spit-like bar or a gridiron. These utensils are generally rigid, but the latter may also be collapsible or rollable.

These forms of construction prevent the easy cleaning of the utensils, particularly the collapsing pins or rolling links thereof, where grease, dust or other dirt tends to gather and harden, making it difficult to operate.

It is an object of this invention to provide a utensil having all of the advantages of those of the conventional type as regards carrying facility and small volume when not in use, but without the drawbacks as set forth above.

A further object of the invention is to provide a broiling utensil constituted by a broiler removably connected to a supporting bar, wherein said broiler with the broiled meat retained thereon may be carried to the table, thereby eliminating the step of first placing the food on a dish or the like, as required with known broiling utensils.

A further object of the invention is to provide a utensil of the aforesaid type, wherein the broiler can be turned relative to the support thereof in order to obtain a uniform broiling of the food exposed to the fire.

A still further object of the present invention is to provide a broiling utensil having means for adjusting the height of the broiler relative to the fire.

Generally, the broiling utensil of this invention comprises a supporting bar adapted to be partly driven into the ground, a fork-like broiler having a stem and gripping means and being adjustably supported by said supporting bar, said broiler having at least two arms, a plurality of removable spit members extending through said arms, a handle and a stop member fixed to said supporting bar, said supporting bar comprising a tubular body including a clamping screw member and an upstanding wing member terminating in a pair of diverging end portions the spaced edges of which have at least one semicircular notch, said notches having respective coaxial centers and constituting bearing points for said broiler stem, whereby said broiler is turnable and removable relative to said supporting bar.

In order that the invention may be more clearly understood and readily carried into practice, a preferred embodiment thereof has been illustrated by way of example in the accompanying drawings, wherein.

The same reference characters are used to indicate like or corresponding parts throughout the drawings.

Figure 1:
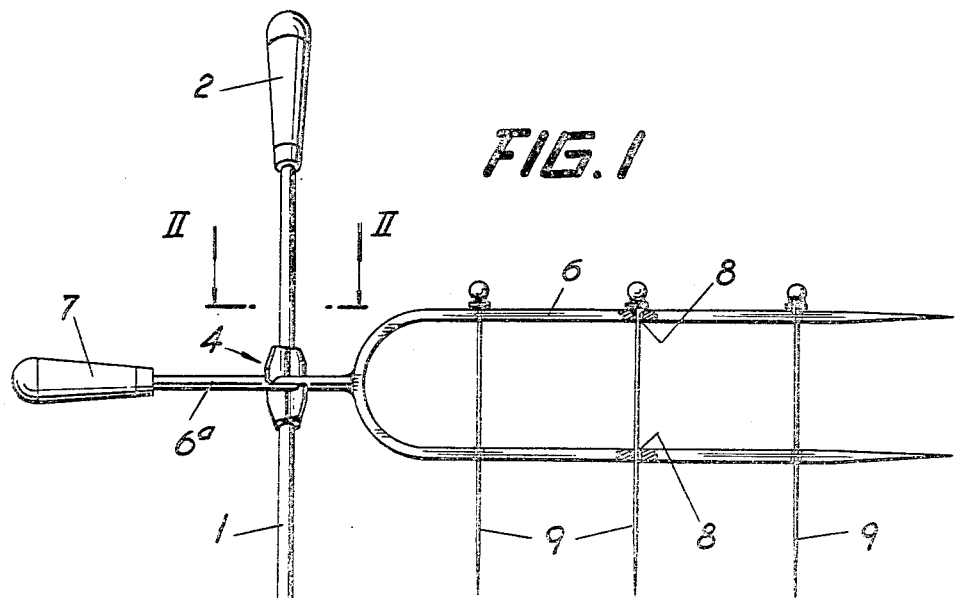
FIG. 1 is a front elevational view of a broiling utensil according to this invention, in operative position on the ground.

Referring to the drawings, and particularly to FIG. 1, the utensil as shown comprises a supporting bar 1 having a pointed end 1$^a$ and a handle 2 at the opposite end. The supporting bar 1 is adapted to be driven into the ground to a certain depth, such as that indicated by a stop defined by a screw member 3 engaging a screw-threaded hole in said supporting bar 1.

A supporting member 4 is movably mounted on the bar 1 at a point between the handle 2 and the stop screw 3, and the position thereof is set by means of a clamping screw 5 extending through a portion of said member 4 and engaging the supporting bar 1. A broiler 6 extending substantially perpendicularly to the supporting bar 1 is removably mounted on said supporting member 4 and is shown to comprise a forked rod having pointed free ends for inserting thereon the food to be broiled. From the crotch of the forked broiler 6 extends an integral stem 6$^a$ the free end of which is provided with a handle 7. The arms of the broiler 6, which are shown to be substantially parallel, are provided with a plurality of opposed orifices 8 adapted to be engaged by corresponding spit members 9 for transversely holding the food to be broiled.

Figure 2:
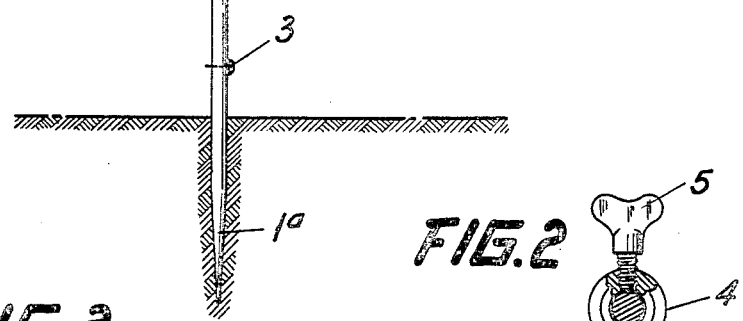
FIG. 2 is a cross-sectional view taken along the lines II—II in FIG. 1 and in an enlarged scale.
Figure 3:
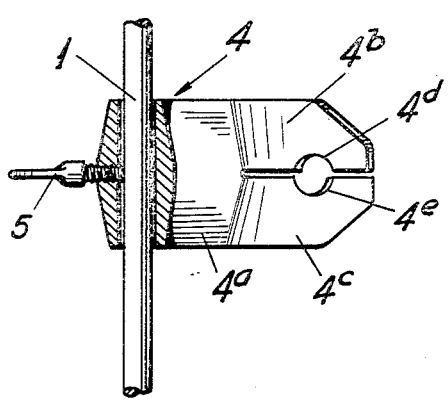
FIG. 3 is an enlarged view of the member supporting the broiler shown in FIG. 1.

As shown in FIGS. 2 and 3, the supporting member 4 is constituted by a tubular body and comprises a vertical wing portion 4$^a$ terminating in a pair of diverging end portions 4$^b$ and 4$^c$ the inner edges of which are formed with opposed semi-circular notches 4$^d$ and 4$^e$ the coaxial centers of which constitute, respectively, the bearing and resistance points for the broiler 6. As shown in FIG. 2, said notches 4$^d$ and 4$^e$ permit the free rotary movement of the broiler 6 supported thereby when the handle 7 is rotated.

While the utensil as disclosed herein comprises only two broiler arms and three spits, it will be readily understood that the number of both arms and spits may vary as desired.

It will also be understood that in carrying out the invention, many changes and/or modifications will occur to those skilled in the art without departing from the scope thereof as set forth in the appended claims.

What is claimed is:

1. Broiling utensil, particularly for broiling over a fire on the ground, comprising a supporting bar adapted to be partly driven into the ground, a fork-like broiler having a stem and gripping means and being adjustably supported by said supporting bar, said broiler having at least two arms, a plurality of removable spit members extending through said broiler arms, a handle at one end of said supporting bar, a stop member in said supporting bar in a position removed from said handle, an adjustable means clamped to said supporting bar for adjustably supporting said broiler thereon, comprising a tubular body including a clamping screw member and an upstanding wing portion terminating in a pair of diverging end portions the inner edges of which have each at least one semicircular notch, said notches being in opposed relationship and having respective coaxial centers constituting bearing points for said broiler stem, whereby said broiler is turnable and removable relative to said supporting bar.

2. Broiling utensil as claimed in claim 1, wherein the end of said supporting bar opposite said handle is outwardly tapered.

3. Broiling utensil as claimed in claim 1, wherein said spit members engage aligned orifices formed in said broiler arms.

4. Broiling utensil as claimed in claim 1, wherein said stop member is a screw member engaging a screw-threaded orifice in said supporting bar.

References Cited

UNITED STATES PATENTS

| 1,384,250 | 7/1921 | Froom. |
| 1,697,966 | 1/1929 | Rubel. |
| 2,198,134 | 4/1940 | Spiegl. |
| 2,482,068 | 9/1949 | Larson. |

WALTER, A. SCHEEL, Primary Examiner

J. M. BELL, Assistant Examiner

U.S. Cl. X.R.

126—30; 248—301